(No Model.)

G. W. WILLIAMS.
STEAM COOKING APPARATUS.

No. 294,945. Patented Mar. 11, 1884.

WITNESSES
F. L. Ourand
E. G. Siggers.

Geo. W. Williams
INVENTOR
by C. A. Snow & Co.
Attorneys

UNITED STATES PATENT OFFICE.

GEORGE W. WILLIAMS, OF PORTIS, KANSAS.

STEAM COOKING APPARATUS.

SPECIFICATION forming part of Letters Patent No. 294,945, dated March 11, 1884.

Application filed September 18, 1883. (No model.)

*To all whom it may concern:*

Be it known that I, GEORGE W. WILLIAMS, a citizen of the United States, residing at Portis, in the county of Osborne and State of Kansas, have invented a new and useful Steam Cooking Apparatus, of which the following is a specification, reference being had to the accompanying drawings.

This invention relates to apparatus for cooking articles of food by steam; and it has for its object to provide means for cooking several different articles at one time, the cooking being performed in compartments separate and independent from each other, so that the flavor of one will not destroy or affect the taste of the others.

A further object of my invention is to provide for shutting off the supply of steam to any one compartment or all of them, while a still further object of my invention provides for delivering the steam from the boiler directly on top of the articles placed in the several compartments.

To attain these and other objects my invention consists in certain details of construction and combination of parts, as hereinafter set forth, and particularly pointed out in the claim.

Figure 1:
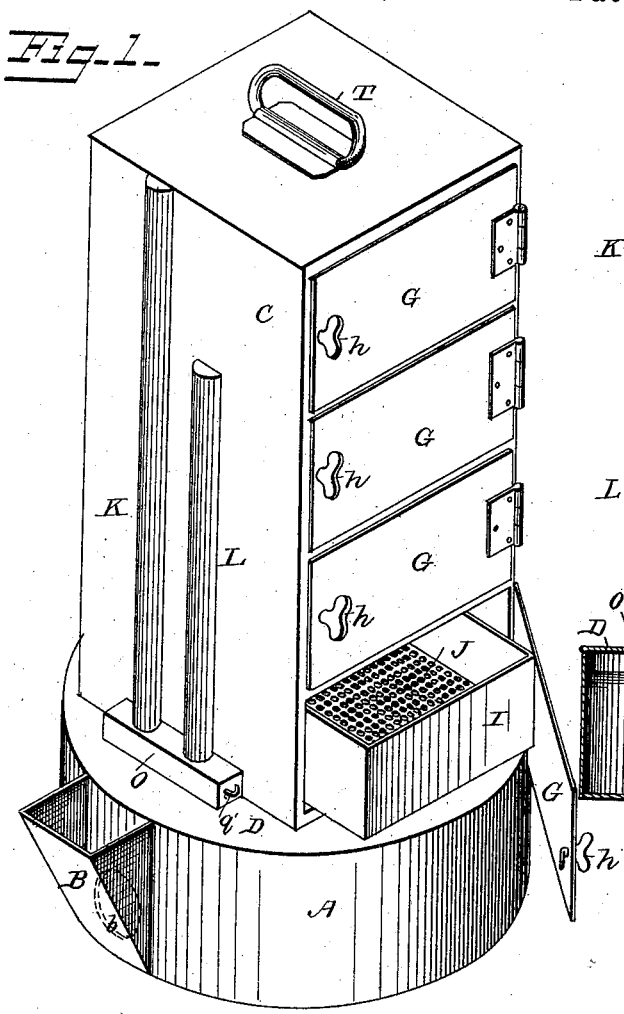
Figure 2:
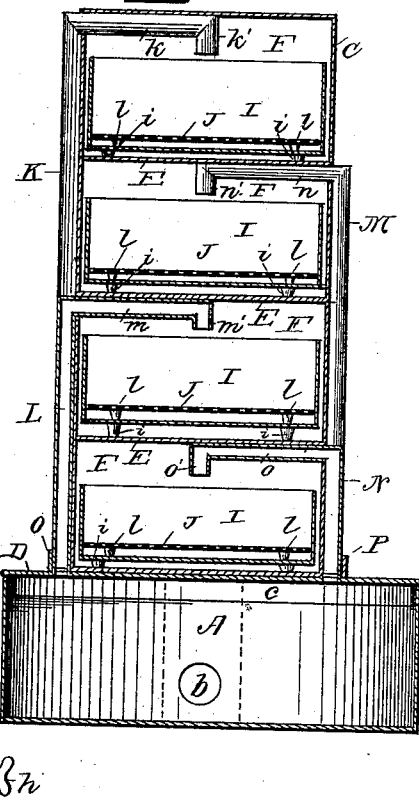
Figure 3:
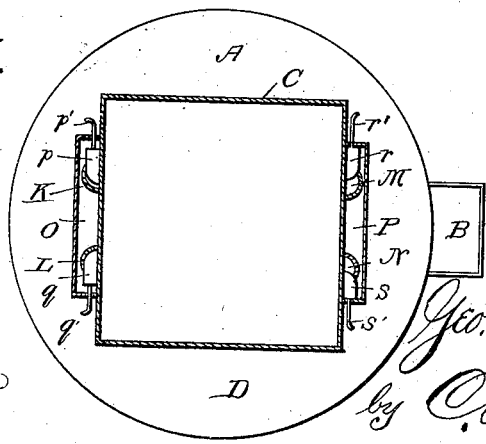

In the accompanying drawings, Figure 1 is a perspective view of my improved steam cooking apparatus. Fig. 2 is a vertical section of the same. Fig. 3 is a horizontal section.

Like letters refer to corresponding parts in the several figures.

Referring to the drawings, A designates the bottom vessel or water-boiler of my improved steam-cooker, said boiler being formed at the bottom with an inwardly-turned flange or rim, to adapt it to fit around the usual openings of a common cooking-stove.

On the side of the boiler A is formed a spout, B, at the bottom of which an opening, $b$, is formed in the boiler, so that the latter can be readily filled by pouring the necessary quantity of water through the spout, and the depth of water in the boiler will show the true depth in the spout, and thus when the amount of water in the boiler is getting low it is not necessary to take off the cooking-compartments to supply the boiler, as the arrangement and construction of the spout permit this to be done while cooking is going on.

C designates the casing inclosing the several cooking-compartments, and erected upon a base, D, which is provided with a depending flange, $c$, arranged to fit inside the mouth of boiler A. Said casing is provided with three or more partitions, E, forming compartments F, separate and independent from each other, each compartment being provided with doors G, either swinging or sliding, having catches $h$ to hold the doors closed.

I designates a series of pans resting on the bottom of the compartments F, and formed with legs $i$, to raise said pans above the same, the articles to be cooked being placed in the pans, which rest on the partitions E, and the steaming or cooking being performed by the action of the steam conducted from the water-boiler A, in the manner presently to be described. A series of false bottoms, J, constructed of perforated sheet metal, having legs $l$, may be placed inside the pans I when it is desired to cook the articles dry, the moisture from the steam passing through the holes of the false bottom and settling on the bottom of the pans. A series of pipes, K L M N, extend from the water-boiler A to each of the compartments F, and conduct the steam generated in the boiler to the said compartments. As shown, each of the pipes is formed separate and independent from the others, and is secured to the exterior face of the casing C, the pipe K extending up the entire height of the casing, and formed with a bend or joint, $k$, which passes into the interior of the upper compartment, and is secured to the upper wall of the same. A discharge-spout, $k'$, extends downward from the end of joint $k$, and it will be seen that the steam conducted from the pipe K will pass through the said joint and outward through the spout, and since the spout is above the central portion of the compartment the articles contained in the pan will receive the steam directly from above, the steam diffusing itself over the whole surface of the pan in the manner well known. Each of the pipes L M N is formed with the joints $m$ $m$ $o$, respectively, and with the downwardly-extending spouts $m'$ $n'$ $o'$, arranged in the same manner as the joint and spout of the pipe K, the pipes, with their aforesaid joints and spouts, being secured in the same manner in the lower compartments as the pipe K is in the upper compartments, and thus the steam will be conducted from the water-boiler and diffused in the said compartments in a likewise similar manner. At the point of junction of the pipes with the base D are formed valve-chambers O P—one for each pair of pipes—and in the valve-chambers work sliding valves $p\ q\ r\ s$, having handles $p'\ q'\ r'\ s'$, arranged to close the opening connecting the pipes to the water-boiler. By means of this construction it will be seen that by operating either one or all of the sliding valves communication between the water-boiler and any one or all of the compartments is shut off or opened at pleasure, and it will also be seen that the operation of the sliding valves is performed independent of each other.

A bail or handle, T, is attached to the upper part of my improved steam-cooker, to serve as a means for lifting it off the stove.

The operation of my invention is obvious. Water is poured into the boiler A through the spout B, and as soon as the heat from the stove begins to boil the water the steam will rise from the same and pass through the several pipes K L M N and be conducted into the several compartments, where it is diffused in the manner above set forth. Thus the articles placed within the cooking-pans will be cooked by the action of the steam delivered from the top of each compartment, and by this course the cooked or steamed articles will be moist, which is very desirable in some cases; but should it be desired to cook or steam the contents of pans I so as to avoid this moisture, it is only necessary to place the said articles upon a false bottom, J, which rests on the bottom of the pans.

The advantages of my improved steam-cooker are numerous; but I shall recite only a few of them here. Since the compartments are formed independent from each other, the cooking can be performed without any danger of the articles in one compartment tainting or affecting the taste of the articles in the other compartments. The construction of the pipes and the manner in which the steam is delivered add to the efficiency of the cooking, since it will take less time and the articles will be more thoroughly and evenly cooked than heretofore. The sliding valves provide for shutting off the supply of steam to any one compartment when it is desired to utilize all the steam for the remainder of the compartments; and when the contents of the pans have been thoroughly cooked, or when the cook wishes to examine any one of the compartments, the steam is first shut off from said compartment, the door is opened, and she is at liberty to examine it, the cooking of the contents of the pans in the remaining compartments going on as usual.

My cooking apparatus is simple, durable, and efficient, and will form a very inexpensive article for the kitchen.

In order to define more clearly the nature, scope, and advantages of my invention, I would have it understood that I claim nothing shown in the patents of Yinger, No. 135,682, dated February 11, 1873; Wood, No. 225,905, dated March 23, 1880; and Welling, No. 275,302, dated April 3, 1883. Said patents do not show my simple, compact, and efficient arrangement of parts constituting the cooking apparatus as set forth in the appended claim.

Having described my invention, what I claim as new is—

In a steam cooking apparatus, the combination, with the boiler A, of a casing, C, separated into a series of compartments having doors G, pipes K L M N, communicating with the boiler independently of each other and extending up along the length of the casing, bends or joints $k\ m\ n\ o$, connecting with the top of the pipes and extending into the interior of the compartments, valve-chambers O P, located at the rear end of each pair of pipes, and valves $p\ q\ r\ s$, adapted to slide in said chambers, as and for the purpose set forth.

In testimony that I claim the foregoing as my own I have hereto affixed my signature in presence of two witnesses.

GEORGE W. WILLIAMS.

Witnesses:
OSWALD WILLIAMS,
A. W. FLENNIKEN.